United States Patent [19]

Herwig et al.

[11] Patent Number: 4,910,046
[45] Date of Patent: Mar. 20, 1990

[54] PAINT RESIN AND ITS USE FOR POWDER COATING

[75] Inventors: Jens Herwig; Hans-Heribert Burgdörfer, both of Cologne; Dieter Woltjes, Dormagen, all of Fed. Rep. of Germany

[73] Assignees: EC Erdolchemie GmbH, Cologne-Worringen; Bayer Aktiengesellschaft, Leverkusen, both of Fed. Rep. of Germany

[21] Appl. No.: 262,554

[22] Filed: Oct. 25, 1988

[30] Foreign Application Priority Data

Nov. 3, 1987 [DE] Fed. Rep. of Germany ....... 3737194

[51] Int. Cl.$^4$ .......................... B05D 3/02; B05D 3/08
[52] U.S. Cl. .................................... 427/195; 526/272; 526/318.45; 526/318.6; 525/327.8; 525/330.2
[58] Field of Search ................ 526/272, 318.45, 318.6; 525/327.8, 330.2; 427/195

[56] References Cited

U.S. PATENT DOCUMENTS 3,215,678  11/1965  Adelman et al. ............... 526/318.45
3,483,171  12/1969  Kühlkamp et al. ............. 526/318.45
4,173,669   1/1979  Ashida et al. ..................... 525/330.2
4,177,336  12/1979  Seven et al. ..................... 526/318.45
4,446,274   5/1984  Okazaki ............................. 526/272

Primary Examiner—Joseph L. Schofer
Assistant Examiner—Alex H. Walker
Attorney, Agent, or Firm—Sprung Horn Kramer & Woods

[57] ABSTRACT

A paint resin for powder coating is described which consists of modified high-pressure polyethylene (LDPE) and is characterized by (a) a content from 0.1 to 1 mol %, based on the total number of moles of all monomers, of unsaturated carboxylic acids present as copolymerized units, and/or the equivalent content of carboxylic anhydrides,
(b) a neutralization degree of the carboxyl groups, which can also originate from anhydride groups, from 0 to less than 50%,
(c) a termonomer content from 0 to 5 mol %, based on the total number of moles of all monomers,
(d) a melt flow index from 20 to 200 g/10 minutes (190° C.; 2.16 kp) and
(e) a particle size from 1 to 600 μm, as well as the use thereof in a process for powder coating.

15 Claims, No Drawings

PAINT RESIN AND ITS USE FOR POWDER COATING

BACKGROUND OF THE INVENTION

1. Field of the Invention

The invention relates to a novel paint resin based on a modified high-pressure polyethylene (LDPE) with special adhesion characteristics and the use thereof for powder coating.

2. Description of the Related Art

There has been no shortage of attempts to protect structures and components, particularly metal substances, from the effect of corrosive enviroments by coatings of reasonably priced and chemically resistant polymers, such as polyethylene or polyvinyl chloride. However, the adhesion characteristics of these polymers are inadequate with the result that corrosion creep sets in on the metal surfaces under the coatings and longterm protection is impaired.

Copolymers from ethylene and unsaturated carboxylic acids are already known (U.S. Pat. No. 3,520,861). The acid content is described therein as 0.1-20% by weight; yet only with an acrylic acid content of not less than about 4% by weight are adhesion characteristics achieved which are adequate for using such copolymers for coating and laminates.

For economic reasons, the acid copolymer is often employed as primer only for the more reasonably priced polyolefin. For example, GB 2,097,809 describes a steel pipe coating produced with a 0.25 mm film thickness of a primer consisting of a propylene-acrylic acid copolymer, and 2.5 mm film thickness of a topcoat consisting of a mixture of polypropylene/polybut-1-ene.

An operation using greater amounts of unsaturated carboxylic acids makes high demands in respect of corrosion resistance on the polymerization equipment. For this reason an earlier study was carried out (U.S. Pat. No. 3,132,120) using the tert.-butyl esters of unsaturated carboxylic acids present as copolymerized units instead of the unsaturated carboxylic acids. After the polymerization the carboxyl group must then be freed by pyrolysis with elimination of isobutene. However, here, too, higher acid contents, for example 4.2% by weight of methacrylic acid, are necessary to achieve adequate adhesion characteristics.

SUMMARY OF THE INVENTION

It has now been found, surprisingly, that in applying coatings produced from modified polyethylene, very small contents of unsaturated carboxylic acids present as copolymerized units are sufficient to obtain adequate adhesion characteristics, provided that the chosen method of application of the coating is that of powder coating and that to this end the melt flow index of such resins is adjusted to higher values. In addition, such modified polyethylene possess adhesion characteristics that are surprising for powder coating and could not be foreseen; they will be described in greater detail below.

The invention relates to paint resin for powder coating which consists of modified high-pressure polyethylene (LDPE) and is characterized by (a) a content from 0.1 to 1 mol%, based on the total number of moles of all monomers, of unsaturated carboxylic acids present as copolymerized units, and/or the equivalent content of carboxylic anhydrides, (b) a neutralization degree of the carboxyl groups, which can also originate from anhydride groups, from 0 to less than 50%, (c) a termonomer content from 0 to 5 mol%, based on the total number of moles of all monomers, (d) a melt flow index from 20 to 200 g/10 minutes (190° C.; 2.16 kp) and (e) a particle size from 1 to 600 μm.

DETAILED DESCRIPTION OF THE INVENTION

The paint resin according to the invention has a content from 0.1 to 1 mol%, preferably from 0.2 to 0.6 mol%, based on the total number of moles of all monomers, of one or more unsaturated carboxylic acids present as copolymerized units. Examples of such unsaturated carboxylic acids are acrylic acid, methacrylic acid, crotonic acid or itaconic acid. When dibasic unsaturated carboxylic acids are used, only one half of the above content need to be considered according to the invention because of the double number of carboxyl groups present. Examples of such dibasic carboxylic acids are maleic acid or fumaric acid. Furthermore, it is possible according to the invention to use a dibasic unsaturated carboxylic acid also in the form of its anhydride; an example of this is maleic anhydride. The use of acrylic acid, methacrylic acid and maleic anhydride is preferred.

The paint resin according to the invention can be prepared by a high-pressure process, known to the person skilled in the art, for polyethylenes or polyethylene copolymers. To this end pressures in the range from 500 to 3000 bar, preferably from 1200–3000 bar, are preferred, the temperatures being in the range from 120° to 300° C., preferably from 160° to 280° C., particularly preferably from 200° to 260° C. The polymerization is carried out mainly on a continuous basis in an adiabatically operated autoclave which corresponds to an almost ideally stirred reactor, or in a corresponding autoclave cascade; when an autoclave cascade is utilized, use may be made of the possibility of employing the subsequent autoclaves as residence time reactors for completing the comonomer conversion. The operation in series using two stirred autoclaves is particularly preferred with the possibility of an almost complete comonomer conversion in the second reactor. The mixture of monomers can of course be divided into several partial streams for the autoclave cascade. Furthermore, the polymerization can be carried out in a flow tube or in a combination of stirred autoclave and flow tube. The high-pressure polymerization is carried out in the presence of a radical polymerization initiator, for example in the presence of tert.-butyl peracetate, di-tert.-amyl peroxide, di-tert.-butyl peroxide, tert.-butyl hydroperoxide, tert.-amylperpivalate, butyl per-2-ethylhexanoate, tert.-butyl perpivalate, tert.-butyl perneodecanoate, tert.-butyl perisononanoate, tert.-amyl perneodecanoate or tert.-butyl perbenzoate.

By adding molecular weight regulators, such as saturated or unsaturated hydrocarbons or oxo compounds, for example ethane, propane, propene, propanal, acetone, acetaldehyde and the like the molecular weight and hence the melt flow index can be adjusted. The paint resin according to the invention has a melt flow index from 20 to 200 g/10 minutes (190° C.; 2.16 kp), preferably from 40 to 120 g/10 minutes, particularly preferably from 50 to 100 g/10 minutes.

The paint resin according to the invention has furthermore a termonomer content from 0 to 5 mol %. Examples of such termonomers are vinyl acetate, acrylonitrile, carbon monoxide, sulphur dioxide, maleic diesters, acrylic esters, methacrylic esters or also mixtures of these substances, vinyl acetate or mixtures of vinyl acetate/carbon monoxide being preferred. When such termonomers are present in the paint resin, their content is for example from 0.1 to 5 mol %, preferably from 0.1 to 4 mol %, based on the total number of moles of all monomers.

In order to copolymerize such termonomers, they are added to the ethylene used for the high-pressure polymerization described above in a manner customary for the person skilled in the art. A content of termonomers is, however, not obligatory for the paint resin according to the invention and can therefore be omitted; this is expressed by the above limit value of 0 (zero) mol %.

Furthermore, the carboxyl groups present in the paint resin according to the invention can be in the non-neutralized form or a part of them can be in the neutralized form. The former form corresponds to a neutralization degree of 0%, while the latter form corresponds to a neutralization degree other than zero. The neutralization degree of the LDPE modified according to the invention is in general from zero to less than 50% of all the carboxyl groups present, for example from 0 to 49%. These carboxyl groups can also originate from anhydride groups.

When the neutralization is a partial one, it is preferably from 5 to 40%. Particularly favourable results are obtained with a neutralization degree from 10 to 30%. Monovalent, divalent or trivalent cations, such as those of lithium, sodium, potassium, magnesium, calcium, zinc, copper or aluminium, are suitable for the neutralization. Monovalent or divalent cations are preferably used, sodium or zinc being particularly preferred.

The unsaturated acids and/or anhydrides referred to above are added to the ethylene used in a manner known to the person skilled in the art similarly to the termonomers. When a part of the carboxyl group is neutralized in the manner described, the neutralization can be carried out in a variety of ways. Thus, for example, a mixture of one or more unsaturated carboxylic acids and the appropriate salt or salts, when this mixture is homogeneous, is added to the used ethylene, either together or separately from the optionally added termonomers prior to the entry of the mixture in the high-pressure reactor. However, in many cases it is expedient to use a solvent for the unsaturated carboxylic acids and their salts to be employed. Examples of suitable solvents for this purpose are methanol, ethanol, propanol, isopropanol, butanol, isobutanol, amyl alcohol, glycols, but also other solvents which are stable under high-pressure polymerization conditions, such as dimethylformamide or tetrahydrofuran; mixtures of these solvents can of course be also used. A minimum amount of the solvent to be used is that which will permit the preparation of a homogeneous solution of the unsaturated carboxylic acids and their salts. The upper limit of the amount of solvent is defined by economic considerations, since the solvent must be eliminated from the polymerization reaction. Amounts from 2 to 10 parts by weight of solvent per 1 part by weight of the mixture acid/salt, preferably 4 to 7 parts of solvent per 1 part of the mixture acid/salt, are often suitable.

However, it is also possible to introduce first the unsaturated acid or its anhydride in the polymerization reaction and only carry out the described neutralization on the finished copolymer. In such a case the finished copolymer can be treated, for example in a subsequent compounding step, with suitable compounds of the metal cations referred to above, such as metal oxides, metal hydroxides, metal formates, metal acetates or metal salts of other readily volatile organic or inorganic acids. Since the amounts of resultant cleavage products (water, formic acid, acetic acid, carbon dioxide or other readily volatile organic or inorganic acids) are small, they can remain in this copolymer without any special degassing of the copolymer. In its preferred form, such a subsequently performed reaction is carried out in the discharge extruder of the high-pressure polymerization.

The paint resin according to the invention has surprising adhesion characteristics which had not been foreseeable. Thus, when applied in the form of a powder coating, the paint resin achieves adhesion values that can only be achieved otherwise with an acid content from 3 to 10%. The melt flow index of the paint resin to be adjusted according to the invention ensures a good flow-out of the powder paint even into surface irregularities such as pores and grooves. Areas that are accessible only with difficulty are thus also reached, coated with a high degree of security and so for example protected against corrosion. The intimate surface contact has a favourable effect on adhesion to the surface of the substrate to be coated. Examples of powder coating methods are coating by the whirl-sintering process, electrostatic coating and coating by the so-called flame spraying process. For this purpose the particle sizes are adjusted from 1 to 600 $\mu$m, preferably from 3 to 400 $\mu$m, particularly preferably from 5 to 300 $\mu$m. For the last-named coating process it is an advantage to employ particle sizes to the lower part of the ranges indicated above. Examples of substrates to be coated are metal, glass and ceramic surfaces, surfaces of chemical plant materials and others. The coating of metal surfaces using the paint resin according to the invention is of particular importance.

The invention thus further relates to a process for powder coating of structures and components, particularly metal substrates with synthetic paint resins which is characterized by the use of the modified high-pressure polyethylene (LDPE) described above as such a paint resin.

The outstanding adhesion values which can be achieved and the fact that even areas which are difficult to reach, can be reached illustrates the superiority of the powder coating effected using the LDPE modified according to the invention as paint resin over coating of substrates using films, by lamination, by dip coating and by hot sealing compounds.

It was found, surprisingly, that the final values of adhesion are attained only after hours or even days. This makes it possible to peel off the paint film applied with the aid of the paint resin according to the invention within this time without encountering difficulties and without damaging the surface of the substrate, for example in order to make good or correct coating defects; this surprising characteristic of slight initial adhesion permits for example the protection of substrate surfaces temporarily by a coating in order subsequently to expose the substrate surface and make it accessible by peeling off the paint film. The adhesion end values of the paint resin according to the invention are from 2.2 to about 3N/mm, expressed as the peeling force which has to be applied in order to remove the paint film from the substrate. Known polyethylene/(meth)acrylic acid copolymers with a considerably higher unsaturated acid content exhibit only slightly higher peeling forces.

The paint resin according to the invention can be adapted to the various requirements in the best possible manner. Thus the addition of a termonomer, referred to above, imparts a greater elastomeric character to the paint film obtained by powder coating, so that even substrates which in their use are subjected to a certain degree of bending, can be coated with the paint resin unreacted ethylene in a flash separator downstream of the reactors.

Propionaldehyde (PRAL) was added to the input stream to adjust the molecular weight. The reaction temperature was controlled by the amount of initiator added.

The test parameters and product characteristics are listed in the table.

For powder coating the polymers were ground to an average particle size of 160 μm.

TABLE

Paint resins produced from high-pressure polyethylene modified with unsaturated carboxylic acids and, optionally, vinyl acetate (VA)

| Example No. | Ethylene (kg/h) | Unsaturated acid* (g/h; type) | VA (g/h) | Regulator (g/h; type) | Initiator Reactor (g/h:type) | Initiator Reactor (g/h:type) | Temperature Reactor (°C.) | Temperature Reactor (°C.) | Comonomer content (wt/mol %) | Melt flow Index (g/10 min) |
|---|---|---|---|---|---|---|---|---|---|---|
| 1 | 40 | 78 MA | — | 232 PRAL | 1.1 PO | 0.2 PN | 212 | 250 | 1.3/0.43 MA | 55 |
| 2 | 40 | — — | 3770 | 113 PRAL | 0.8 APPV | 0.1 PN | 180 | 230 | 9.7/3.4 VA | 63 |
| 3 | 40 | 449 MA | — | 100 PRAL | 1.9 PO | 0.4 PN | 212 | 250 | 10/3.51 MA | 66 |
| 4 | 40 | 61 MA | 3810 | 113 PRAL | 1.2 APPV | 0.1 PN | 180 | 230 | 1.5/0.49 MA +11.1/3.9 VA | 75 |
| 5 | 40 | 46 AA | 3830 | 118 PRAL | 2.7 APPV | 0.1 PN | 180 | 230 | 0.65/0.26 AA +11.8/4.1 VA | 74 |
| 6 | 40 | 80 AA | — | 205 PRAL | 1.5 PO | 0.1 PN | 212 | 250 | **1.4/0.56 AA 15% as Zn ionomer | 62 |

*MA = methacylic acid
AA = acrylic acid
**neutralized to 15% with $Zn^{2+}$ according to the invention. The addition of the termonomers can also bring about higher values of the initial adhesion of the paint film, which may again meet special requirements.

The partial neutralization of the carboxyl groups increases the internal strength of the paint film. The partial neutralization acts in the solid state by additional ionic bonds in the sense of molecular crosslinking or enlargement, while it is not noticeable in a molten state application.

Finally, the paint resin for powder coating according to the invention represents an extremely economic alternative over, for example, lamination using conventional copolymers which, however, contain higher proportions of unsaturated acids. Even the use of a primer which is linked to the higher cost of two-coat painting, can be dispensed with. The paint resin for powder coating according to the invention achieves the advantageous characteristics indicated using a remarkably small proportion of unsaturated acids present as copolymerized units. This small proportion firstly reduces the corrosive effect of such acids which has a beneficial influence on production economics. Secondly, the small proportion of unsaturated carboxylic acids, the price of which is about four times that of ethylene, reduces raw material costs. The combined result of these effects is that the use of the paint resin according to the invention for powder coating makes this solventless and therefore environmentally safe process economically more attractive.

EXAMPLES 1-6

The streams of monomers listed in the table are copolymerized in two 700 ml glandless continuous-flow high-pressure autoclaves in series with ideal back-mixing at a reaction pressure of up to 1.850 bar by the appropriate addition to the two reactors of PO (tert.-butyl perisooctanoate), APPV (amyl perpivalate) or PN (tert.-butyl perisononanoate). The metered stream of the mixture of monomers was divided in the ratio 5:1 between reactors 1 and 2. The copolymer is freed from The paint resins were applied by a whirl-sintering process to blasted steel panels 2 mm thick.

Example 1

Prewarming: 7 min. at 330° C.
Immersion time: 6 sec.
Melting time: 7 sec.

A smooth, clear, well-adhering paint coating was obtained the adhesion of which increased distinctly with increasing storage time.

| Storage time (days) | ⅛ | 1 | 2 | 10 | 17 |
|---|---|---|---|---|---|
| Peeling force (N/mm) | 1.4 | 1.8 | 2.2 | 2.5 | 2.7 |

Example 2 (for comparison)

Prewarming: 8 min. at 320° C.
Immersion time: 6 sec.
Melting time: 3 sec.

The smooth, clear coating, 0.6 mm thick, could be pulled off in the DIN 53 289 floating roller peel test using 2 cm wide strips. The peeling forces increased with storage time:

| Storage time (days) | ⅛ | 1 | 2 | 10 | 17 |
|---|---|---|---|---|---|
| Peeling force (N/mm) | 1.2 | 1.35 | 1.4 | 1.5 | 1.5 |

Example 3 (for comparison)

Prewarming: 8 min. at 320° C.
Immersion time: 6 sec.
Melting time: 4 sec.

A 0.6 mm thick coating was obtained.

| Storage time (days) | ⅛ | 1 | 2 | 10 | 17 |
|---|---|---|---|---|---|
| Peeling force (N/mm) | 3.0 | 3.2 | 3.3 | 3.6 | 3.5 |

Example 4

Prewarming: 8 min. at 320° C.
Immersion time: 6 sec.
Melting time: 4 sec.

| Storage time (days) | ½ | 1 | 2 | 10 | 17 |
|---|---|---|---|---|---|
| Peeling force (N/mm) | 1.1 | 1.6 | 2.2 | 2.25 | 2.2 |

For a paint resin based on polyethylene, the coating had an exceptionally good adhesion to the metal surface.

Example 5

Prewarming: 8 min. at 320° C.
Immersion time: 6 sec.
Melting time: 5 sec.

| Storage time (days) | ½ | 1 | 2 | 10 | 17 |
|---|---|---|---|---|---|
| Peeling force (N/mm) | 1.8 | 2.3 | 2.5 | 2.6 | 2.8 |

The coating adhered very well to the metal without an adhesion promoter and, after being kept for four hours in hot water at 60°, can only be removed by applying a considerable force (which is otherwise only the case for resins containing about 10% by weight of methacrylic acid).

Example 6

Prewarming: 8 min. at 320° C.
Immersion time: 6 sec.
Melting time: 6 sec.

The resultant smooth coating of the ionomer, 0.6 mm thick, exhibited an adhesion strength of 1.3N/mm which increased considerably with further storage as in Example 1.

| Storage time (days) | ½ | 1 | 2 | 10 | 17 |
|---|---|---|---|---|---|
| Peeling force (N/mm) | 1.3 | 1.9 | 2.3 | 2.7 | 2.8 |

What is claimed is:

1. A paint resin for powder coating comprising a high-pressure polyethylene (LDPE) and is characterized by
   (a) a content from 0.1 to 0.6 mol%, based on the total number of moles of all monomers, of unsaturated carboxylic acids present as copolymerized units, or the equivalent content of unsaturated carboxylic anhydrides,
   (b) a neutralization degree of the carboxyl groups from 5 to less than 50%,
   (c) a termonomer content from 0 to 5 mol%, based on the total number of moles of all monomers,
   (d) a melt flow index from 20 to 200 g/10 minutes (190° C.; 2.16 kp), and
   (e) a particle size from 3 to 400 μm.

2. The paint resin according to claim 1, characterized by acrylic acid and/or methacrylic acid and/or maleic anhydride being present as copolymerized units.

3. The paint resin according to claim 1, characterized by a termonomer content of vinyl acetate or vinyl acetate/carbon monoxide mixtures in an amount from 0.1 to 5 mol%, based on the total number of moles of all monomer.

4. The paint resin according to claim 1, characterized by a neutralization degree of the carboxyl groups from 5 to 40%.

5. The paint resin according to claim 4, characterized by a neutralization degree of the carboxylic groups from 10 to 30%.

6. The paint resin according to claim 1, characterized by a content from 0.2 to 0.6 mol%, based on the total number of moles of the monomers, of unsaturated carboxylic acids.

7. The paint resin according to claim 1, characterized by a melt flow index from 40 to 120 g/10 minutes (190° C.; 2.16 kp).

8. The paint resin according to claim 7, characterized by a melt flow index from 50 to 100 g/10 minutes (190° C.; 2.16 kp).

9. The paint resin according to claim 1, characterized by a particle size from 5 to 300 μm.

10. The paint resin according to claim 1, prepared in a high-pressure polyethylene process at a pressure of from 500 to 3000 bar, at a temperature of from 120° to 300° C., and in the presence of radical polymerization initiators.

11. The paint resin according to claim 1, characterized in that the melt flow index is adjusted by the addition of molecular weight regulators to the high-pressure polyethylene process.

12. A process for powder coating of structures and components comprising applying a synthetic paint resin to a structure or component, the resin comprising a high-pressure polyethylene (LDPE) the resin being characterized by
   (a) a content from 0.1 to 0.6 mol%, based on the total number of moles of all monomers, of unsaturated carboxylic acids present as copolymerized units, or the equivalent content of carboxylic anhydrides,
   (b) a neutralization degree of the carboxyl groups from 5 to less than 50%,
   (c) a termonomer content from 0 to 5 mol% based on the total number of moles of all monomers,
   (d) a melt flow index from 20 to 200 g/10 minutes (190° C.; 2.16 kp), and
   (e) a particle size from 3 to 400 μm.

13. A process according to claim 12, characterized in that the paint resin contains acrylic acid and/or methacrylic acid and/or maleic anhydride present as copolymerized units.

14. A process according to claim 12, characterized in that the paint resin contains a termonomer vinyl acetate or vinyl acetate/carbon monoxide mixtures in amounts from 0.1 to 5 mol% based on the total number of moles of all monomer.

15. A process according to claim 12, characterized in that the carboxyl groups are neutralized to 5–40%.

* * * * *